United States Patent [19]
Altmann et al.

[11] Patent Number: 5,401,083
[45] Date of Patent: Mar. 28, 1995

[54] HYDRAULIC VEHICLE BRAKE SYSTEM WITH AN ANTI-SKID SYSTEM

[75] Inventors: Rainer Altmann, Erligheim; Rainer Lauer, Weissach-Flacht; Anton Van Zanten, Ditzingen-Schoeckingen; Juergen Binder, Stuttgart; Michael-Raymond Meyer, Ludwigsburg, all of Germany

[73] Assignee: Robert Bosch GmbH, Stuttgart, Germany

[21] Appl. No.: 165,054

[22] Filed: Dec. 10, 1993

[30] Foreign Application Priority Data

Dec. 10, 1993 [DE] Germany ............... 42 41 595.0

[51] Int. Cl.6 .................. B60T 8/32; B60T 8/36
[52] U.S. Cl. ............... 303/113.2; 303/116.1; 303/113.4; 303/117.1; 303/DIG. 3
[58] Field of Search ........... 303/113.2, 113.4, 115.1, 303/115.2, 115.4, 116.1, 117.1, 116.2, DIG. 1, DIG. 2, DIG. 3, DIG. 4, 119.1; 364/426.02, 426.03

[56] References Cited

U.S. PATENT DOCUMENTS

| | | | |
|---|---|---|---|
| 4,412,701 | 11/1983 | Burckhardt | 303/6.01 |
| 4,809,183 | 2/1989 | Eckert | 364/426.04 |
| 5,039,175 | 8/1991 | Holzmann et al. | 303/116.1 X |
| 5,141,296 | 8/1992 | Arikawa | 303/116.1 X |

FOREIGN PATENT DOCUMENTS

| | | | |
|---|---|---|---|
| 3006137 | 8/1981 | Germany. | |
| 4109925 | 10/1991 | Germany. | |
| 4104504 | 8/1992 | Germany | 303/116.1 |
| 4063757 | 2/1992 | Japan | 303/113.2 |

*Primary Examiner*—Robert J. Oberleitner
*Assistant Examiner*—Peter M. Poon
*Attorney, Agent, or Firm*—Edwin E. Greigg; Ronald E. Greigg

[57] ABSTRACT

A hydraulic motor vehicle brake system having anti-skid system and further developed to improve vehicle tracking, especially during cornering by means of automatic braking. With automatic braking an auxiliary pressure source delivers a pressure medium to an anti-skid system, by means of which braking pressures can be individually adjusted in the wheel brakes. For this purpose a cylinder with separating piston sections is located between the auxiliary pressure source and the anti-skid system, wherein the separating piston is installed into 2/2-way valves including lip sealing rings. The embodiment in accordance with the invention include cylinders, with valve openings in cooperation with the lip sealing rings, which results in economical 2/2-way valves.

4 Claims, 2 Drawing Sheets

HYDRAULIC VEHICLE BRAKE SYSTEM WITH AN ANTI-SKID SYSTEM

FIELD OF THE INVENTION

The invention is based on a hydraulic brake system as defined hereinafter.

BACKGROUND OF THE INVENTION

A hydraulic vehicle brake system with an anti-skid system and a control device is known from U.S. Pat. No. 4,809,183. Furthermore, a hydraulic pressure source and at least one evaluating circuit are associated with the anti-skid system for detecting an oversteering tendency, an understeering tendency and the start of the danger of skidding, and for generating control signals for the anti-skid system, so that this system automatically brakes the vehicle with the use of the hydraulic pressure source, and from case to case the wheels of one wheel axle or of all wheel axles are braked. The automatic braking stabilizes the vehicle, thus counteracting an oversteering tendency, an understeering tendency, or a danger of skidding, or skidding that is already in progress. The pressure source is not shown. To obtain the control signals, king pin inclinations are measured, for example, and compared with preselected threshold values. The rotating velocity of the vehicle around the vertical axis can also be observed by means of a gyroscope, for example. Alternatively, transverse accelerations can be measured by means of acceleration sensors associated with the axles and evaluated.

German Patent Disclosure DE 41 09 025 A1 discloses a hydraulic vehicle brake system with advantageous, closed brake circuits and an anti-skid system that operates in accordance with the so-called recalculating pump principle, and in which a combination of a controllable 2/2-way valve and a cylinder with a separating piston and a restoring spring for the separating piston is installed for each brake circuit, between this anti-skid system and a main brake cylinder, to control the cornering of a vehicle; a common auxiliary pump and a 3/2-way valve disposed downstream of it are also provided for both brake circuits for controlled charging of the separating piston and to control the 2/2-way valves, which are hydraulically controllable by means of control inputs for closing the brake lines between the cylinders and the main brake cylinder. Pressures generated in the cylinders after the main brake lines have been blocked are modulated by means of the anti-skid system and supplied individually to the wheel brakes of the four wheels. The anti-skid system can also individually reduce the pressures supplied to the wheel brakes. A control device that controls both the 3/2-way valve and the anti-skid system to improve the cornering of the vehicle equipped in this manner can also activate a driving motor for the auxiliary pump. The disadvantage is that, because of the hydraulic connection of the cylinders with modulation valve arrangements of the anti-skid system, the auxiliary pump must deliver a pressure at the level of the highest brake pressure to be expected during cornering. Correspondingly, the auxiliary pump must be embodied to be powerful; a required driving motor is heavy and stresses an electrical system of the vehicle in a disadvantageous manner. The heavy driving motor and the heavy auxiliary pump are expensive. A further disadvantage is that, because of the high pressure generated, disturbing and possibly very aggravating noises occur during pump operation. A reservoir that can be charged by the auxiliary pump is also expensive, as is the electrically controllable 3/2-way valve that controls the charging of the separating piston and the hydraulic control inputs of the 2/2-way valves. Moreover, because of the embodiment of the cylinder and its separating piston, the respective 2/2-way valve must be combined with a check valve function, so that during automatic brake operation the transition into normal brake operation can immediately take place solely through operation of the brake pedal. Therefore, in the disclosed exemplary embodiment the symbol of a check valve is allocated to the second position of the 2/2-way valves.

It is known from U.S. Pat. No. 4,412,701 to further embody a hydraulic vehicle brake system with a main brake cylinder and wheel brake cylinders for automatic distance control from a preceding vehicle, and/or to limit wheel slip. For this purpose a cylinder with a separating piston embodied as a stepped piston and displaceably disposed therein is installed for each brake circuit, between the main brake cylinder and the wheel brake cylinders. An auxiliary pressure source is associated with the cylinders. The separating piston has a lip sealing ring in the region of its large diameter, and there defines a primary chamber that can be charged by pressure from the auxiliary pressure source. In the region of the opposite end of the separating piston, which has a smaller diameter, the separating piston has a further lip sealing ring that defines a secondary chamber within the cylinder. A valve opening in the wall of the cylinder is associated with this lip sealing ring. When the separating piston is displaced, this lip sealing ring travels across the valve opening and, in this way, forms a 2/2-way valve with the opening. The valve opening is connected to the main brake cylinder. The secondary chamber communicates with wheel brake cylinders. In this respect, braking is possible on the one hand by means of pressure from the main brake cylinder by operating a brake pedal and, on the other hand, automatically by means of introducing auxiliary pressure from the auxiliary pressure source into the primary chamber, wherein the auxiliary pressure displaces the separating piston, closes the 2/2-way valve and generates the required brake pressure in the secondary chamber. A third lip sealing ring whose sealing lip likewise points toward the secondary chamber is disposed between the two lip sealing rings. Between the third lip sealing ring and the lip sealing ring on the side of the primary chamber, the cylinder has a pressure equalization opening open to the outside. It is disadvantageous that leakage caused by wear or damage to the lip sealing ring associated with the valve hole cannot be detected during normal braking operations; rather, it is first detected when automatic braking is intended to be initiated, and either no braking effect or a braking effect of inadequate duration results. When this leakage is present, the middle lip sealing ring should assure normal braking with the operation of the main brake cylinder. Whether the middle lip sealing ring itself is leaky cannot be detected during automatic braking, and can only be detected by chance with normal braking by means of the main brake cylinder when the main brake cylinder and the lip sealing ring associated with the valve hole are leaky. If both seals are leaking, the additional disadvantage arises that the pressure medium flows around both lip sealing rings, and the pressure medium escapes into the environment through the pressure equalization opening. By means of this, the vehicle brake system is emptied, so that a braking effect can no longer be generated.

German Patent Application P 42 32 311.8 (DE 42 32 311 A1) proposes to provide a hydraulic vehicle brake system designed for automatic braking for the purpose of improving the driving performance of a vehicle (driving dynamics control) and/or traction control with a cylinder with a separating piston displaceably disposed therein, and an auxiliary pump for automatically charging the separating piston whose pressure is significantly lower than the full brake pressure generated in the main brake cylinder, between a main brake cylinder connection and an anti-skid system, that operates in accordance with the so-called recirculating pump principle. To assure operational reliability and monitoring capability with regard to operational reliability, the separating piston has two piston sealing rings. Moreover, the piston, connected to a conduit leading out between the piston rings and communicating with the main brake cylinder, includes a 2/2-way valve embodied as a seat valve with a ball embodied as a sealing element that is closed when the piston is displaced by means of auxiliary pressure. A 2/2-way valve in seat design, built into the separating piston, is expensive. A further exemplary embodiment proposed by this German patent application P 42 32 311.8 (DE 42 32 311 A1), with a cylinder and a 2/2-way valve, additionally includes a floating piston that likewise has two piston sealing rings for reasons of operational reliability. This exemplary embodiment is even more expensive than the first exemplary embodiment mentioned. In both exemplary embodiments it is provided that the cylinders can be connected via electrically operable 2/2-way valves to intakes of the recirculating pumps for the purpose of automatic braking, so that the recirculating pumps can exert high pressure for braking on the pressure medium originating from the cylinders.

OBJECT AND SUMMARY OF THE INVENTION

The hydraulic vehicle brake system of the invention has the advantage that lower technological expenditures are required for the cylinder and the separating piston and its 2/2-way valve than in the example of German Patent Application P 42 32 311.8 (DE 42 32 311 A1), and that, in contrast to the example of a cylinder and separating piston with three seal rings in accordance with U.S. Pat. No. 4,412,701, in case of leakage of the lip sealing rings associated with the secondary chamber, those quantities of pressure medium that trickle through because of the operation of the main brake cylinder are supplied to the reservoir of the main brake cylinder. As a consequence, the hydraulic vehicle brake system embodied in a way in accordance with the invention is itself protected against emptying when both of the lip sealing rings associated with the secondary chamber are leaking, and also when the lip sealing ring associated with the primary chamber is leaking. Thus, the possibility arises of achieving at least a short-time braking effect through arbitrarily frequent application of the brake pedal. The cylinder with the separating piston designed in accordance with the invention can, of course, also be inserted into a brake system in accordance with the document mentioned in the introduction to the description, DE 41 09 025 A1.

An advantageous further development and improvement of the vehicle brake system disclosed is possible by means of the provision outlined herein. The features set forth result in the advantage that the second 2/2-way valve is closed before the lip sealing ring of the first 2/2-way valve passes across the associated valve opening, by means of which an undesired discharge of pressure medium from the main brake cylinder into the reservoir is prevented.

The invention will be better understood and further objects and advantages thereof will become more apparent from the ensuing detailed description of a preferred embodiment taken in conjunction with the drawings.

DESCRIPTION OF THE PREFERRED EMBODIMENT

Figure 1:
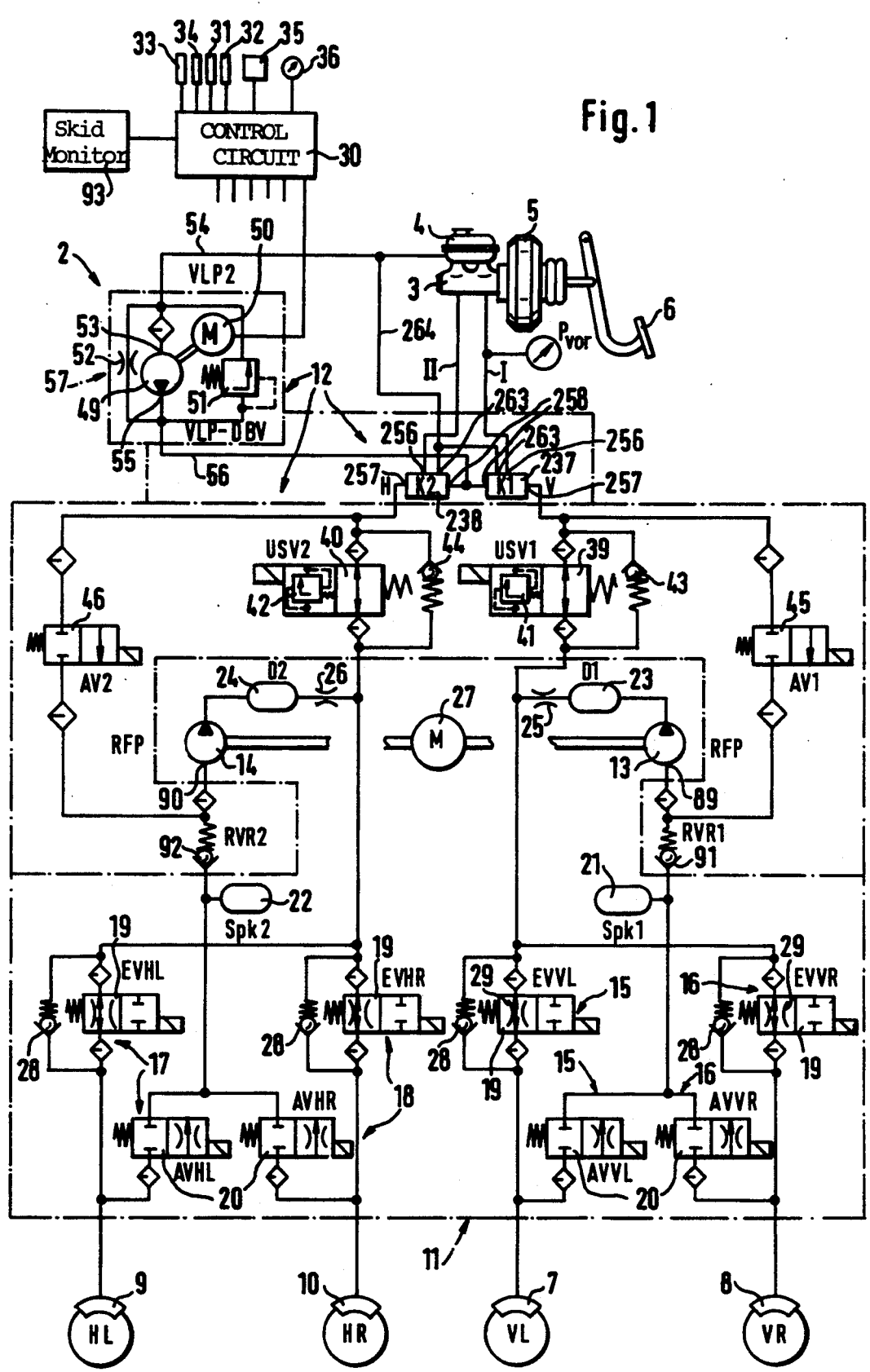
FIG. 1 shows a circuit diagram for the exemplary embodiment.

The exemplary embodiment in FIG. 1 of the hydraulic vehicle brake system of the invention has a dual-circuit main brake cylinder 3 with a reservoir 4 that supplies it and a pneumatic power brake 5, for example, as well as a brake pedal 6, two brake circuits I and II, front-wheel brakes 7 and 8 associated with brake circuit I, rear-wheel brakes 9 and 10 associated with wheel circuit II, an anti-skid system 11 disposed between the main brake cylinder 3 and the wheel brakes 7 through 10, and an additional device 12 for automatic braking.

The main brake cylinder 3 is embodied in a way that is known per se, and is operable with the aid of the brake pedal 6. The effect of brake pedal 6 on the main brake cylinder 3 can be increased by the power brake 5. The reservoir 4 supplies the main brake cylinder 3 with a pressure medium that, for normal braking operation, can be pushed from the main brake cylinder 3 in the direction of the wheel brakes 7 through 10, through the additional device 12 and the anti-skid system 11.

The anti-skid system 11 is an anti-skid system of the so-called recirculating pump type, and has a recirculating pump 13 for the brake circuit I and a recirculating pump 14 for the brake circuit II. Further, the anti-skid system 11 has a brake pressure modulation valve arrangement 15, 16, 17 or 18, comprised of a brake pressure buildup valve 19 and a respective braking pressure reduction valve 20, for each wheel brake 7 through 10, as well as a reservoir 21 or 22 for each brake circuit I and II. Moreover, a first damping chamber 23 for the brake circuit I, for example, and a second damping chamber 24 for the brake circuit II and a damping throttle 25 or damping throttle 26 are provided. A motor 27 is associated as the drive with there circulating pumps 13 and 14. Starting at the wheel brakes 7 through 10, their respectively associated brake pressure buildup valves 19 can be bypassed in the direction toward the main brake cylinder 3 by means of check valves 28, which can be opened in the direction toward the main brake cylinder 3 in case of a drop in pressure above the respective brake pressure buildup valve 19, for example when this valve is switched into its blocked position, or when an installed throttle is effective when the valve is in its open position.

Anti-skid operation is possible by means of the said individual elements for the anti-skid system 11. For this purpose the brake pressure buildup valves 19 are normally in the open position and located between the respective wheel brakes 7 through 10 and the main brake cylinder 3, so that pressures generated in the main brake cylinder 3 can normally travel into the wheel brakes 7 through 10 by means of operation of the brake pedal 6. Respective braking pressure decrease valves 20 of the brake pressure modulation valve arrangements 15 and 16 or 17 and 18, likewise connected to the wheel brakes 7 through 10, are closed in the normal position and permit a throttling passage in the activated position, and communicate on the inlet side with the recirculating pump 13 of the brake circuit I or on the inlet side with the recirculating pump 14 of the brake circuit II. The damping chambers 23 or 24 are connected on the outlet side of the recirculating pump 13 or 14. The throttles 25 or 26 follow the damping chambers 23 or 24 in the direction toward the main brake cylinder 3 and the respective brake pressure buildup valves 9.

A further control device 30, shown in outline, is also part of the anti-skid system 11, as are the wheel revolution sensors 31 through 34 associated with the wheels, not shown, of the wheel brakes 7 through 10, The control device 30 is connected to these wheel revolution sensors 31 through 34. The individual valves 19, 20 of the brake pressure modulation valve arrangements 15 through 18 are connected on one side to the control device 30 itself, and the motor 27 is connected to the control device on the other side. Furthermore, a brake pedal switch 35 and/or a pressure sensor 36, for example, that are connected to the control device 30 can be disposed in the region of the brake pedal 6.

Through the operation of the brake pedal 6, with the aid of the power brake 5, for example, pressure is generated in the main brake cylinder 3 that is propagated to the wheel brakes 7, 8, 9 and 10 through the open brake pressure buildup valves 19 of the two brake circuits I and II.

If the brake pedal 6 is increasingly strongly applied on a uniformly non-skid road surface, for example, the sequences of signals emitted by the wheel revolution sensors 31 through 34 are changed in a way that is ultimately interpreted by the control device 30 as a danger of wheel locking. Assuming that the danger of wheel locking threatens at all wheels at the same time and with the same intensity, the control device 30 activates the motor 27 and therefore the recirculating pumps 13 and 14, closes all of the brake pressure buildup valves 19 of the brake pressure modulation valve devices 15 through 18, and opens all associated braking pressure decrease valves 20. The consequence of this is that pressure that might still be increasing in the main brake cylinder 3 does not reach the wheel brakes 7 through 10; instead, quantities of pressure medium flow out of these wheel brakes to the storage chambers 21 or 22. As a consequence, these recirculating pumps 13 and 14 force pressure medium through the damping chambers 23 and 24 and the throttles 25 and 26, and through the two brake circuits I and II, back to the main brake cylinder 3. After the danger of wheel locking has ceased, assuming that the danger of wheel locking happens to disappear simultaneously for all of the wheels 7 through 10, the brake pressure modulation valve arrangements 15 through 18 are brought into their base positions, in that the control device 30 halts the supply of control currents necessary for the decrease in braking pressure. If, during a subsequent, preselected period of time no further danger of wheel locking occurs, for example, then the control device 30 also halts the current supply to the motor 27.

In a way known per se, for example, the control device 30 is also designed such that pressures of the front-wheel brakes 7 and 8 can be modulated individually and independently of one another, so that the best possible braking effect of the front wheels can be generated on roadways with partially varying frictional values. For instance, a low frictional value .can be present to the right at the edge of a road as a consequence of ice formation, and a high frictional value can be present to the left under the vehicle across a dry stretch of road.

An individual control or regulating principle of this type can also be applied for the rear-wheel brakes 9 and 10, but a so-called "select-low" control, for example, is also used under certain conditions, i.e., if one of the rear wheels threatens to lock, the braking pressure in the wheel brake of the other rear wheel is also reduced. By means of this, the contribution made by the rear-wheel brakes to vehicle deceleration is reduced if need be; however this can be of great advantage because it favors lateral guiding forces during the execution of a curve. In this case a favorable effect on driving performance is meant in the sense that a lateral drifting of the rear wheels out of the curve can be suppressed. The said "select-low" control of the rear-wheel brakes 9 and 10 is therefore a useful measure for affecting the motion pattern of the vehicle, particularly the rotating behavior around the center of gravity or the vertical axis of the vehicle. An undesired angular deceleration of the vehicle around the vertical axis, that is, inherent dynamics of the vehicle, can thus be counteracted in the described manner.

A cylinder 237 or 238, a reversing valve 39 or 40, a pressure-limiting valve 41 or 42 and, for safety reasons, a check valve 43 or 44 are part of the device 12 for automatic braking inside the brake circuits I and II, respectively. Moreover, 2/2-way valves 45 and 46 as well as check valves 91 and 92 are associated on the inlet side with the recirculating pumps 13 or 14. For indirect supply, an auxiliary pump 49 with an auxiliary motor 50, an auxiliary pressure-limiting valve 51 and a throttle 52 are also part of the device 12.

The auxiliary motor 50 is connected to the control device 30 and can be activated by the control device 30, so that the auxiliary pump 49 can be driven. The auxiliary pump 49 has an inlet 53, which in the example is connected to the reservoir 4 of the main brake cylinder 3 via a line 54. An outlet 55 is connected to the two cylinders 237 and 238 via an auxiliary pressure line 56. The auxiliary pressure-limiting valve 51 is connected on the inlet side to the outlet 55 of the auxiliary pump 49, and can be opened in the direction toward the inlet 53 of this auxiliary pump 49 or the line 54, which communicates with the reservoir 4. The auxiliary pressure-limiting valve 51 is designed such that it can open by means of a pressure with a magnitude of 5 to 10 bar, for example. The throttle 52 is likewise connected to the outlet 55 of the auxiliary pump 49 and communicates on the other side with the line 54 and the inlet 53 of the auxiliary pump 49. When the auxiliary pump 49 is stopped, the throttle 52 assures the elimination of differences in pressure between the outlet 55 and the inlet 53. The listed elements form a controllable auxiliary pressure source 57 because of the cooperation of the control device 30 with the auxiliary motor 50.

Figure 2:
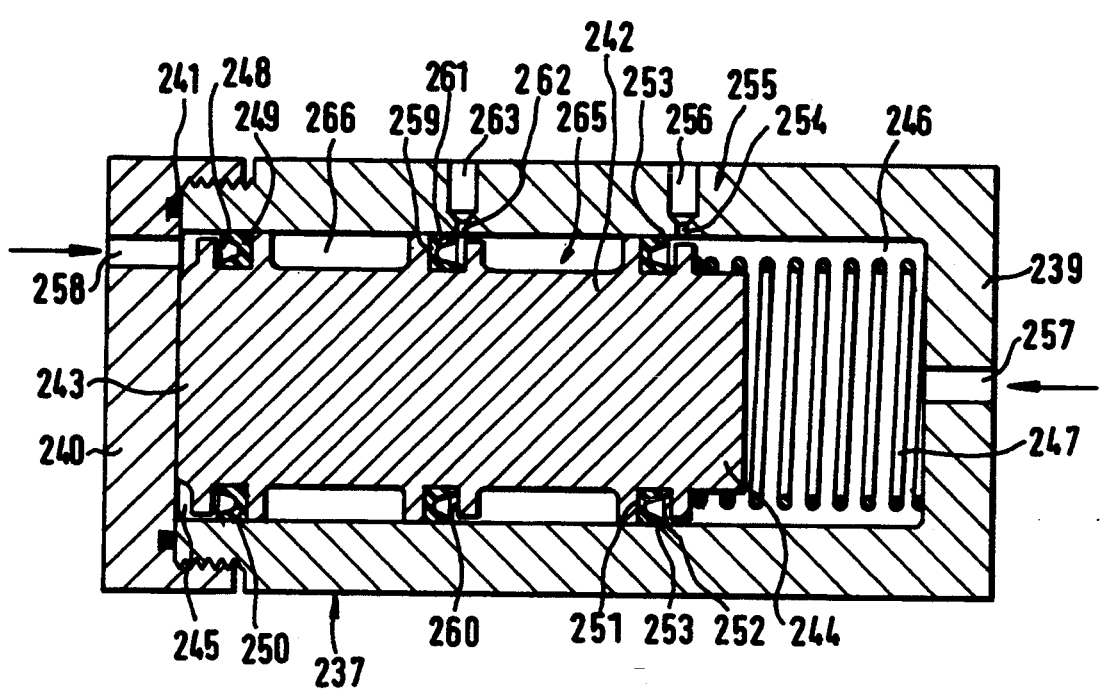
FIG. 2 is a detail for the exemplary embodiment of FIG. 1 in longitudinal section.

Cylinders 237 and 238 are embodied identically. Therefore, it is only necessary to describe the cylinder 237 in conjunction with FIG. 2. The cylinder 237 has an end wall 239, and is sealed on the side opposite this wall by means of a screwed-on threaded lid 240. A sealing ring 241 is clamped between this lid 240 and the cylinder 237. A piston 242 is displaceably disposed inside the cylinder 237. The piston 242 has a beginning end 243 adjacent to the lid 240 and an ending end 244 located opposite thereto. A primary chamber 245 is located inside the cylinder 237, adjacent to the lid 240 and the beginning end 243. A secondary chamber 246 is located between the ending end 244 of the piston 242 and the end wall 239. The piston 242 is intended to separate the secondary chamber 246 from the primary chamber 245, and is therefore designated as a separating piston. A piston restoring spring 247 is located in the secondary chamber 246. So that a fluid-proof separation of the secondary chamber 246 from the primary chamber 245 occurs, the separating piston 242 is provided in the region of its beginning end 243 with a lip sealing ring 249 inserted into a circumferential groove 248. In this case a lip 250 of the lip sealing ring 249 points toward the lid 240. To seal the secondary chamber 246, a further lip sealing ring 251 is inserted in the region of the ending end 244 of the separating piston 242 into a circumferential groove 252 cut into the separating piston 242. This lip sealing ring 251 also has at least one lip 253, which points toward the end wall 239 and is therefore suited to contain a pressure to be generated in the secondary chamber 246. A valve opening 254 is associated with the lip sealing ring 251. This is embodied in the way known for main brake cylinders. In this case the valve opening 254 starts from a connection 256 incorporated into the cylinder 237. The connection 256 is connected to the main brake cylinder 3 via the brake circuit II. Therefore the secondary chamber 246 communicates with the main brake cylinder 3 in the base position of the separating piston 242. A further connection 257 for the secondary chamber 246 passes through the end wall 239, for example, for a connection to the anti-skid system 11. It can be recognized, with reference to a known main brake cylinder, that with a displacement of the separating piston 242 in the direction toward the end wall 239, the lip 253 passes across the valve opening 254, thus hydraulically separating the secondary chamber 246 from the main brake cylinder 3. To this extent, the lip 253 and the valve opening form a controllable 2/2-way valve. Thus, when a pressure is generated inside the secondary chamber 246 by means of the displacement of the separating piston 242, this pressure cannot escape to the main brake cylinder 3. On the other side, the lip 253 cooperates with the cylinder 237 as a check valve when a pressure is conveyed through the connection 256 that dominates the pressure present in the secondary chamber 246.

The said displacement of the separating piston 242 is generated by an auxiliary pressure from the auxiliary pressure source 57. The auxiliary pressure line 56 leading from the auxiliary pressure source 57 is guided past an auxiliary pressure connection 258. The auxiliary pressure connection 258 is located in the lid 240, for example.

A further lip sealing ring 259 is located between lip sealing rings 249 and 251, inside a circumferential groove 260 cut into the separating piston 242. The lip sealing ring 259 has a sealing lip 261 which, like the sealing lip 253, is oriented toward the secondary chamber 246. The distance of the sealing lip 261 from the sealing lip 253 is at least as great as the longest possible stroke of the separating piston 242 inside the cylinder 237 starting from the lid 240, in the direction toward the end wall 239. A further valve opening 262 is associated with the lip sealing ring 259, and the two together form a 2/2-way valve. The valve opening 262 originates from a connection 263. The connection 263 is connected via at least one line segment 264 to the reservoir 4 of the main brake cylinder 3. In the base position of the separating piston 242, the valve opening 262 is open, so that an annular space 265 located between the lip sealing rings 251 and 259 communicates with the reservoir 4. When the separating piston 242 is displaced counter to the force of the separating piston restoring spring 247, starting at the lid 240 and with the use of auxiliary force introduced through the connection 258, the sealing lip 261 passes across the valve opening 262, so that an overpressure that is possibly present in the annular space 265 is maintained relative to the pressure in the reservoir 4.

A further annular space 266 is located between the lip sealing ring 259 and the lip sealing ring 249. When the auxiliary motor 50 is shut off, the auxiliary pressure line 56 is unpressurized. As a result, the separating piston 242 rests against the lid 240 in the position shown, which is the normal position. Consequently, the above-mentioned passage is made possible from the main brake cylinder 3 through the secondary chamber 256 and the connection 257 to the anti-skid system 11. The pressure generated in the main brake cylinder 3 by means of the operation of the brake pedal 6 can also be transmitted through the anti-skid system 11 in the direction of the front-wheel brakes 7 and 8. Of course, the same applies for the rear-wheel brakes 9 and 10, because the cylinder 238 installed between the main brake cylinder 3 and the anti-skid system 11 is embodied in the same manner described above.

The connection 257 of the cylinder 237 communicates with the brake pressure buildup valves 19 of the brake pressure modulation valve arrangements 15 and 16 via the normally open reversing valve 39 of the brake circuit I. A bypass that can be opened in the direction toward the said brake pressure modulation valve arrangements 15 and 16 by means of the check valve 43 is disposed in the direction from the cylinder 37 to the brake pressure modulation valve arrangements 15 and 16. The reversing valve 39 is preferably combined with the pressure-limiting valve 41 so that, with electrical activation, instead of a free passage, a passage in the direction toward the main brake cylinder 3 only results when a sufficient drop in pressure predominates between the brake pressure buildup valves 19 and the main brake cylinder 3. This is of such a magnitude that when the main brake cylinder 3 is not operated, the pressure present in front of the pressure-limiting valve 41 is sufficient for automatic braking and, if necessary, blockage of wheels.

The reversing valve 40, the pressure-limiting valve 42 and the check valve 44 are installed in the same manner between the cylinder 238 and the brake pressure buildup valves 19 of the brake pressure modulation valve arrangements 17 and 18.

The 2/2-way valves 45 and 46 are closed in their normal positions, and can be opened electrically. These 2/2-way valves 45 or 46 are located between the connections 257 of the cylinders 237 or 238 and inlets 89, 90 of the recirculating pumps 13 or 14. For the purpose of decoupling the secondary chambers 247 of the cylinders 237 or 238 from the storage chambers 21 or 22, the said check valves 91 or 92 are disposed between these and the 2/2-way valves 45 or 46. These check valves 91 and 92 can be considered to be part of the device 12, because the execution of anti-locking operation alone renders these check valves 91 and 92 unnecessary with the use of so-called free-piston pumps as recirculating pumps 13, 14.

A black box 93 is associated with the additional device 12. The black box 93 includes means such as those described in detail in the introduction to the description for monitoring the vehicle for the start of the danger of skidding. Therefore only the key terms are mentioned here, such as gyroscope and monitoring of the angular acceleration, acceleration sensors, expanded use of wheel revolution sensors and wheel-skid measuring devices and threshold value switches for obtaining control signals that act on the control circuit 30 and, via this control circuit, control the auxiliary pressure source 57, the recirculating pumps 13 and 14, and the brake pressure modulation valve arrangements 15 through 18, the reversing valves 39 and 40 and the 2/2-way valves 45 and 46.

If a danger of skidding occurs during an unbraked execution of a curve in a vehicle equipped in accordance with the invention, for example, this is detected by the monitoring device outlined with the black box 93 that, when a predetermined limit value has been exceeded, controls the brake pressure buildup valves 19 of the rear-wheel brakes, activates the auxiliary motor 50, opens the 2/2-way valve 45, closes the reversing valve 39 and activates the motor 27 for driving the recirculating pump 13, for example. By means of this, the auxiliary pump 49 generates an auxiliary pressure that travels through the line 56 into the primary chamber 245 of the cylinder 237 and displaces the separating piston 242. In the process, the separating piston 242 closes the 2/2-way valve 255 formed by the lip sealing ring 251 and the valve opening 254, and a pressure is generated in the secondary chamber 246, so that pressure medium flows out of this secondary chamber 246, through the opened 2/2-way valve 255 to the inlet 89 of the recirculating pump 13, and through the check valve 43 to the wheel brake cylinders 7 and 8. In this way, the recirculating pump 13 is indirectly filled by means of auxiliary pressure supplied into the cylinder 237 so that the pump can build up a pressure ahead of the closed reversing valve 39 that travels through the open brake pressure buildup valves 19 of the brake pressure modulation valve arrangements 15 and 16 and into the wheel brakes 7 and 8. Both front wheels are braked in this case, for example, because of which the lateral guiding forces of the front wheels are reduced, as the prior art teaches. This has the desired effect that lateral skidding results or is increased to a magnitude or possibly beyond the magnitude of the lateral skidding of the rear wheels.. This has the intended effect that an increase in the rotating velocity of the vehicle around the vertical axis, that is, skidding, is counteracted, or skidding is halted.

When an intended braking pressure in the above sense is attained, the brake pressure buildup valves 19 of the brake pressure modulation valve arrangements 15 and 16 are closed, by means of which at least initially the braking pressures in the wheel brakes 7 and 8 remain constant.

Because a surplus of pressure medium conveyed from the recirculating pump through the pressure-limiting valve 41 during such a period of time would cause a useless energy consumption and disturbing pumping noise, the 2/2-way valve 45 can be temporarily closed by means of the control device 30 during such a period of time. Because of this, the inlet 89 of the recirculating pump 13 receives no pressure medium, and the recirculating pump runs empty.

If the means disposed inside the black box 93 detect that a skidding danger has been sufficiently counteracted, that is, that a fall below a preselected threshold value has occurred, the braking pressure first contained in the wheel brakes 7 and 8 can be at least partly reduced. This is achieved by the opening of the braking pressure reduction valves 20 of the brake pressure modulation valve arrangements 15 and 16. By means of this, pressure medium travels out of the wheel brakes 7 and 8 to the storage chamber 21, and finally also through the check valve 91 into the recirculating pump, from where it is forced back through the pressure-limiting valve 41 into the cylinder 237. In the process, the separating piston 242 recedes counter to the low auxiliary pressure set by the auxiliary pressure-limiting valve 51.

When a new pressure buildup is required, the 2/2-way valve 45 is opened, by means of which the recirculating pump 13 can build up pressure again that can be conveyed to the wheel brakes 7 and 8 in the above-described manner, by means of the brake pressure buildup valves 19.

In the described case, only wheel brakes 7 and 8 are used to improve cornering of the vehicle. For the previously described case, the premise was the danger of skidding by means of drifting of the rear axle, i.e., a so-called oversteering tendency. Vehicles with an oversteering tendency are widespread, but there are also vehicles with an understeering tendency. Depending on the type of load, it can even occur that a vehicle has an oversteering tendency at one time and an understeering tendency at another. If the understeering tendency occurs, the dynamics resulting from inadequate lateral guiding force of the front wheels can be counteracted in a compensating manner in that lateral guiding forces of the rear wheels are automatically reduced. For this purpose braking forces should be automatically supplied to the rear-wheel brakes 9 and 10. This occurs in the same sense as described for the wheel brakes 7 and 8 of the front wheels. Thus, another description that would only be distinguished from the preceding one by different reference numerals is superfluous.

The danger of skidding can arise not only when driving at an essentially uniform speed, but it can also be triggered by means of braking during cornering. This occurs in particular because a dynamic increase in the load on the front wheels and a dynamic reduction in the load on the rear wheels arise during braking, although the center of gravity of the vehicle retains its orientation relative to the front axle and the rear axle. Lateral guiding forces of the rear wheels clearly tend to be weaker relative to the lateral guiding forces of the front wheels, so that an angular acceleration of the vehicle around its center of gravity can be set in, and an unacceptable limit value can be attained. In this case it is necessary to automatically increase a braking pressure selected for the front wheel brakes 7 and 8 by the driver, by operating the brake pedal 6. This is also possible through the startup of the additional device 12 and the anti-skid system 11. With this startup the combination of the anti-skid system 11 and the additional device 12 for automatic braking dominates the driver's judgment. If the driver has already braked, the automatic brake operation causes an increased braking pressure, at least for one of the front-wheel brakes, so that the sum of the lateral guiding forces of the front wheels is reduced, as with the prior art described in the introduction.

Because it can be seen that the vehicle braking system is in the position to automatically inject braking pressures: individually into all wheel brakes of four vehicle wheels, thanks to the four brake pressure modulation valve arrangements 15 through 18, this vehicle braking system is also suited for executing traction control, regardless of whether the front wheels or the rear wheels, or the front and rear wheels are powered. Traction control is executed in accordance with the known requirements, again with the use of the auxiliary pump 49 and the cylinders 237 and 238, as well as the reversing valves 39, 40, the 2/2-way valves 45 and 46 and the anti-skid system 11 in the case of traction control at all four wheels. Because traction control devices are noted for drivable front wheels, to which are assigned diagonal brake circuits, and also for rear wheels, for the majority of which a front-back brake circuit division is selected, a description of control or function for traction control is superfluous.

Depending on the situation, it can become necessary during traction control operation to further increase the braking pressure present in this case in the respective wheel brakes by means of operating the brake pedal. This can be achieved by means of hydraulically overcoming the force of adherence of the lips 253 against the cylinders 237 or 238. Because of this, a flow around the lip sealing ring 251 is possible. If, at this point in time, the reversing valve 39 of the front-wheel brakes, which have wheels that can be powered as a component should still be closed, the pressure opens the check valve 43, which forms a bypass around the still impassable reversing valve 39, so that an increase in braking pressure in the wheel brakes 7 and 8 is possible in the way desired by the driver, and virtually without delay. Although during the course of this, the separating piston 242, because it is charged with a pressure from the secondary chamber 246 that is higher than the auxiliary pressure in the primary chamber 245, will yield in the direction of its initial position with respect to the lid 240, this does not cause an interfering disadvantage, because previously the wheel brakes 7 and 8 were filled by the displacement of the separating piston 242 by only the auxiliary pressure.

FIG. 1 is provided with reference numerals for front-wheel brakes and rear-wheel brakes in such a manner that the brake circuit I is a so-called front-axle brake circuit and brake circuit II is a so-called rear-axle brake circuit. A brake circuit division of this type is also characterized as a TT brake circuit division. The concept of the invention is not limited to such TT brake circuits, however, because it is apparent that so-called diagonal brake circuits, characterized as K brake circuits, can be achieved by means of switching the reference numerals of front- and rear-wheel brakes. In this case all four wheels can be automatically supplied individually with braking pressures, thus counteracting a disadvantageous dynamic individual behavior of the vehicle.

As already mentioned in the introduction to the description, during a normal braking procedure controlled by means of the brake pedal 6, leakage of the lip sealing ring 251 relative to the cylinder 237 or 238 has the effect, because the separating piston 242 is in its base position, that the brake pedal 6 goes further down than would normally correspond to the intended braking pressure. In the process, pressure medium draining between the lip sealing ring 251 and the cylinder 237 and into the annular chamber 265 flows through the valve opening 262, the connection 263 and the at least one line segment 264, into the reservoir 4. There the pressure medium is then available prior to a new operation of the brake pedal 6 for the main brake cylinder 3. Leakage can thus be detected without pressure medium escaping from the hydraulic vehicle brake system into the environment. Because of this, it is possible to use the brakes as often as desired before reaching the next service station. A certain safety risk, therefore, only lies in the fact that the brake pedal must be released intermittently during deliberate vehicle deceleration for so-called re-pumping, because during this release there is, of course, no braking effect.

During operation of the hydraulic vehicle brake system, the lip sealing ring 259 is stressed less than the lip sealing ring 251. This has the advantage that a defective lip sealing ring 251 can be identified relatively early on in normal braking operation.

Should the sealing ring 240 on the side of the primary chamber wear out and therefore leak, pressure medium trickling through it, coming from the auxiliary pressure source 57, can flow along it through the annular chamber 266 and again through the connection 263 and the at least one line segment 264 and into the reservoir 4, so that this pressure medium is available for re-use. Should this pressure medium contain air bubbles or gas bubbles for some reason, these will also flow off in the direction of the reservoir 4, because a flowover into the secondary chamber 246 is counteracted by the displaced lip sealing ring 259 on the one hand or, provided that this ring is not displaced, by the lip sealing ring 251 on the other hand, provided that it is tight.

The foregoing relates to a preferred exemplary embodiment of the invention, it being understood that other variants and embodiments thereof are possible within the spirit and scope of the invention, the latter being defined by the appended claims.

What is claimed and desired to be secured by Letters Patent of the United States is:

1. A hydraulic vehicle brake system having a dual-circuit main brake cylinder, a reservoir for the main brake cylinder, two brake circuits for wheel brakes of a motor vehicle, an anti-skid system associated with the wheel brakes that has brake pressure modulation valve arrangements and a recirculating pump for each brake circuit, an additional device for automatic braking in cooperation with the anti-skid system, wherein this additional device has, between the combination of the main brake cylinder with its reservoir and the anti-skid device, at least one 2/2-way valve for each brake circuit oriented toward this combination and, connected to the anti-skid device, a cylinder with a separating piston that separates a secondary chamber from a primary chamber and has a lip sealing ring supported by the separating piston whose lip seals the secondary chamber, having a piston sealing ring sealing the primary chamber and a separating piston restoring spring, as well as a common auxiliary pump with valve means for both brake circuits, wherein during automatic brake operation the auxiliary pump supplies pressure to the primary chambers to displace the separating piston and close the 2/2-way valves, and having a control device for controlling the anti-skid system to avoid the danger of wheel locking, and the additional device for automatic braking and improvement of the driving performance of the vehicle and for traction control of the powered wheels, the 2/2-way valve (255) comprises a sealing lip (253) of the lip sealing ring (251) on the side of the secondary chamber and a first valve opening (254) communicating with the main brake cylinder (3) in the cylinder (237, 238); that a second valve opening (262) is provided at a distance corresponding to at least the largest possible path of displacement of the separating piston (242) in the direction toward the primary chamber (245); that this second valve; opening (262) is permanently connected to the reservoir (4) of the main brake cylinder (3); and that a second lip sealing ring (259) is associated with the second valve opening (262) whose sealing lip (261) is oriented to point toward the secondary chamber (246), wherein the second valve opening (262) and the second sealing lip (261) form a second 2/2-way valve that can be closed when the separating piston (242) is displaced.

2. The hydraulic vehicle brake system of claim 1, in which a distance of the second valve opening (262) from the first valve opening (254), and a distance of the second sealing lip (261) from the first sealing lip (253) are matched such that, with displacement of the separating piston (242), the first 2/2-way valve (255) can be closed after the second 2/2-way valve (262, 261).

3. A hydraulic vehicle brake system having a dual-circuit main brake cylinder, a reservoir for the main brake cylinder, two brake circuits for wheel brakes of a motor vehicle, an anti-skid system associated with the wheel brakes that has brake pressure modulation valve arrangements and a recirculating pump for each brake circuit, an additional device for automatic braking in cooperation with the anti-skid system, wherein this additional device has, between the combination of the main brake cylinder with its reservoir and the anti-skid device, at least one 2/2-way valve for each brake circuit oriented toward this combination and, connected to the anti-skid device, a cylinder with a separating piston that separates a secondary chamber from a primary chamber and has a lip sealing ring supported by the separating piston whose lip seals the secondary chamber, having a piston sealing ring sealing the primary chamber and a separating piston restoring spring, as well as a common auxiliary pump with valve means for both brake circuits, wherein during automatic brake operation the auxiliary pump supplies pressure to the primary chambers to displace the separating piston and close the 2/2-way valves, and having a control device for controlling the anti-skid system to avoid the danger of wheel locking, and the additional device for automatic braking and improvement of the driving performance of the vehicle or for traction control of the powered wheels, the 2/2-way valve (255) comprises a sealing lip (253) of the lip sealing ring (251) on the side of the secondary chamber and a first valve opening (254) communicating with the main brake cylinder (3) in the cylinder (237, 238); that a second valve opening (262) is provided at a distance corresponding to at least the largest possible path of displacement of the separating piston (242) in the direction toward the primary chamber (245); that this second valve opening (262) is permanently connected to the reservoir (4) of the main brake cylinder (3); and that a second lip sealing ring (259) is associated with the second valve opening (262) whose sealing lip (261) is oriented to point toward the secondary chamber (246), wherein the second valve opening (262) and the second sealing lip (261) form a second 2/2-way valve that can be closed when the separating piston (242) is displaced.

4. The hydraulic vehicle brake system of claim 3, in which a distance of the second valve opening (262) from the first valve opening (254), and a distance of the second sealing lip (261) from the first sealing lip (253) are matched such that, with displacement of the separating piston (242), the first 2/2-way valve (255) can be closed after the second 2/2-way valve (262, 261).

* * * * *